Dec. 18, 1928.  F. W. MERRICK  1,695,715
SLITTING MACHINE
Filed Sept. 14, 1926   2 Sheets-Sheet 1

Inventor:
Frank W. Merrick,
by Emery, Booth, Janney & Varney
Att'ys.

Dec. 18, 1928.

F. W. MERRICK

SLITTING MACHINE

Filed Sept. 14, 1926  2 Sheets-Sheet 2

1,695,715

Inventor;
Frank W. Merrick.
by Emery, Booth, Janney & Varney
Attys.

Patented Dec. 18, 1928.

1,695,715

UNITED STATES PATENT OFFICE.

FRANK W. MERRICK, OF DORCHESTER, MASSACHUSETTS, ASSIGNOR TO AMERICAN STAY CO., OF EAST BOSTON, MASSACHUSETTS, A CORPORATION OF MASSACHUSETTS.

SLITTING MACHINE.

Application filed September 14, 1926. Serial No. 135,299.

This invention relates to slitting machines and its aim is to provide a machine capable of being quickly and easily conditioned accurately to slit a large sheet of material into a number of narrower strips of predetermined widths, or to trim the edges of the sheet.

In the accompanying drawings, wherein I have shown merely for illustrative purposes one embodiment of the invention:

Figure 1:
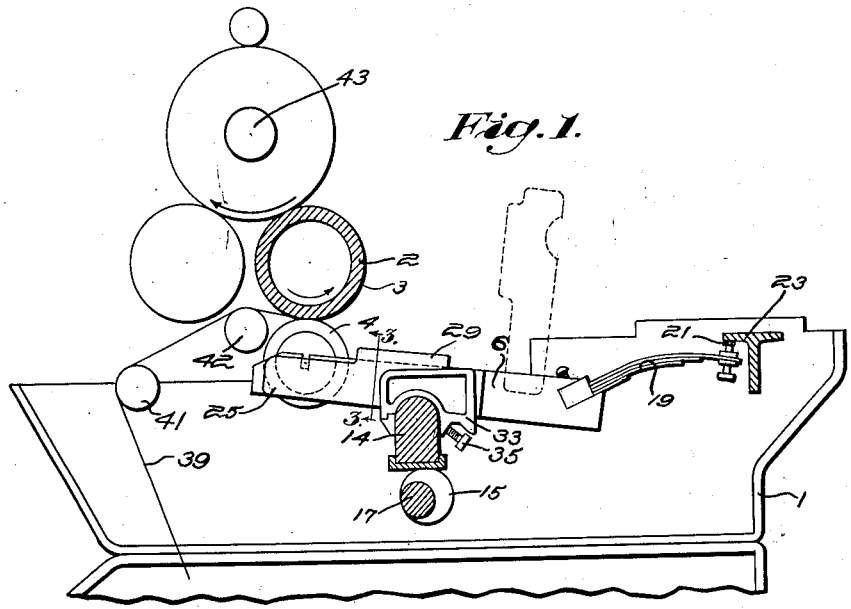
Fig. 1 is a vertical diagrammatic section of the slitting machine, parts of the frame and non-pertinent parts of the machine being broken away or omitted to more clearly illustrate the invention.
Figure 2:
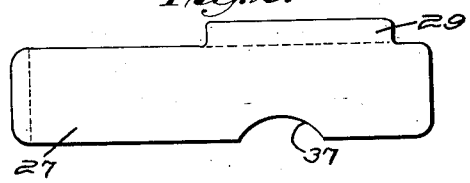
Fig. 2 is a detail side elevation of one of the slitter separator units.

In the accompanying drawings I have elected to show the invention in connection with a series of rotary cutters or slitters of the score-cut type wherein a relatively dull cutting edge is maintained in rolling contact with a hardened surface, the said slitters being adapted for slitting paper, cloth, leather and like materials, but it is to be understood that the invention is not limited to the application shown.

For convenience only those parts of the machine that are closely related to the pertinent features of the invention are shown, these being in somewhat diagrammatic form and including a frame 1 upon which is rotatably mounted in any appropriate manner not shown a platen member or roll 2 having a hardened bearing surface 3.

Cooperating with the hardened platen roll 2 is a series of rotary cutters or slitters 4 provided with relatively dull cutting edges 5 which are caused to roll against the surface 3 of the roll 2 under sufficient pressure to score-cut the material passing between said roll and said slitters.

Figure 4:
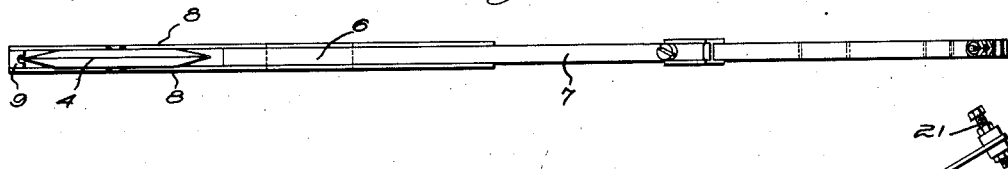
Fig. 4 is a detail plan view of a slitter and its holder.
Figure 5:
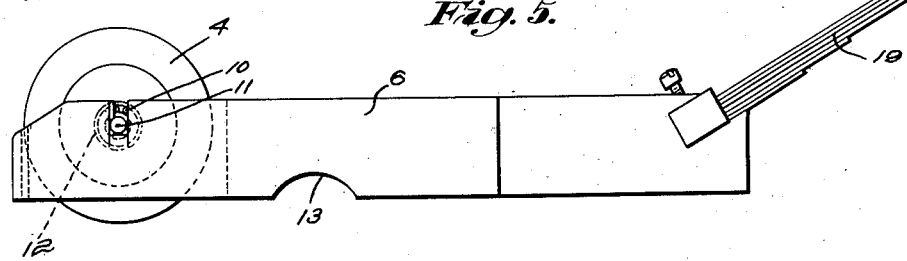
Fig. 5 is a side elevation of the parts shown in Fig. 4.

The slitters 4 are each rotatably mounted in a holder 6 (see Figs. 4 and 5) including a body member 7 carrying spaced slitter supporting members 8 which extend along a considerable portion of the body 7 and on each side of the slitter 4, said members 8 being connected together at the opposite side of the slitter by a filler-block 9. The members 8 are slotted at 10 to receive the ends of an arbor 11 non-rotatably mounted in said slots and carrying an appropriate ball or roller bearing 12 about which the slitter revolves.

Desirably the thickness of the slitter holder which includes the supporting members 8 and the body 7 is substantially equal to the distance between centers of successive slitters when the latter are spaced to form the narrowest finished strip which the machine is capable of producing and when so spaced the outer faces of the members 8 bear against similar faces of adjacent holders and maintain said holders upright so as to steady the slitters during operation under pressure.

The holder 6 is somewhat elongated and at its lower edge is notched at 13 to rest upon an adjustable supporting bar 14. The notch 13 is desirably substantially semi-circular and receives the correspondingly formed upper end of said supporting bar 14, which latter constitutes a pivot about which the holders may be rocked to permit lateral movement of their slitters relatively to the platen member 2 to compensate for varying thicknesses of work.

The direction of movement of the bar 14 is generally toward or away from the plane of the platen roll 2, in the present example in a substantially vertical direction due to the fact that the slitters 4 are arranged beneath the platen roll so as to engage its under surface. To effect adjustment of said supporting bar 14 cams 15 are herein provided, one of which is shown in Fig. 1 carried by a shaft 17 rotatably mounted in the frame 1, it being obvious that by rotation of said shaft 17 and said cams which bear against the under side of the supporting bar 14, said bar may be raised or lowered.

Each slitter 4 is desirably held in yielding contact against the roll 2 preferably by a leaf spring 19 attached to the end of its respective holder 6 opposite to that end carrying the slitter, the outer end of said spring desirably having an adjusting member, herein a screw 21, which is arranged to seat against a cross member 23 carried by the frame 1.

The supporting bar 14 is located between the platen roll 2 and the cross member 23, therefore when said supporting bar 14 is raised by the cams 15 the slitter 4 carried by the holder 6 will be forced against the platen roll while the adjusting member 21 carried by the spring 19 will engage said cross member 23, said spring yielding according to the extent of movement of the cam 15 to effect the desired pressure of the slitter 4 against said platen roller.

The relation of the foregoing members is desirably such that when the cam 15 is lowered and the pressure removed from the slitters said slitter holders will be free to be easily moved longitudinally of the bar 14 for the purpose of varying the spacing of the slitters.

The slitting machine embodying the present invention may be adjusted to carry two or a large number of slitters so that it will trim the rough edges off of a narrow or a wide strip or slit a wide strip into a large number of smaller strips of equal width or of varying widths. When however the widths of the strips that it is desired to form are greater than the thickness of the holder 6, that is the minimum width, it is desirable to introduce between said holders separators which are of just the desired thickness properly to space successive slitters. To this end separators 25 are provided desirably consisting of elongated bars which extend lengthwise of the holders 6, herein approximately the length of the bearing surfaces 8, and at least to the centers of the slitters 4.

In the present example the separators 25 extend from a point at the left of said slitters (see Fig. 1) near the outer peripheries thereof toward the opposite end of said holder substantially beyond the supporting member or bar 14 and by completely filling the space between adjacent slitter holders it will be apparent that said slitters regardless of the pressure applied from beneath urging said slitters toward the platen rolls, will be prevented from moving longitudinally of the platen roll 2 or from tipping sidewise and hence will produce a strip of uniform width throughout with little waste.

The operator may be called upon to make many adjustments of the machine to vary the widths of the strips, particularly where the jobs are rather small. He may wish to adjust the spacing of the slitters at one end only or he may find it convenient to adjust the spacing of the slitters throughout the length of the machine, and if the machine is wide, as it usually is, this conditioning operation may take considerable time. Therefore it is desirable that the separating members 25 be arranged in interchangeable units or groups of varying widths and comprising different numbers of separators.

In the present drawings I have shown three such units. The first unit beginning at the left and marked A is made to embrace three holders and includes two separating members 25 of full thickness, while the outer separators 27 are only half thickness, so that when the unit A is placed beside a similarly spaced unit the half separators of the adjacent units will unite to form a separator of the correct thickness.

Figure 3:
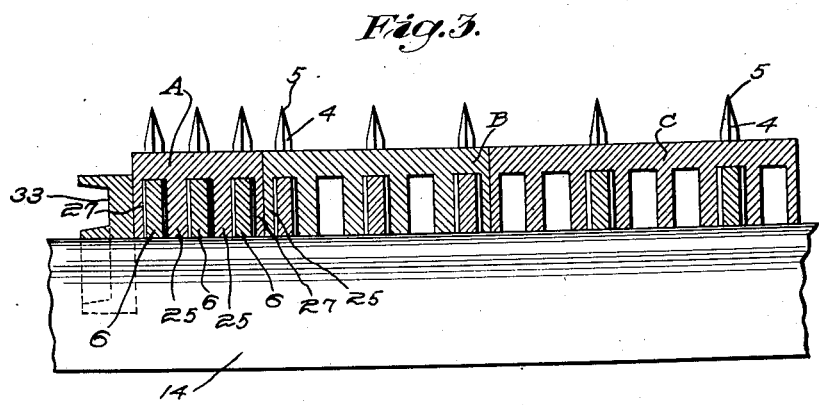
Fig. 3 is a fragmentary section taken on the line 3—3 of Fig. 1.

It may not always be desirable to carry the same spacing of the slitters throughout the length of the machine therefore some spaces may be skipped, as indicated by the unit B (Fig. 3) in which only every other of the grooves formed by the separators 25 are used, and this spacing of the slitters may continue throughout the machine or still greater gaps may be produced by skipping two or more spaces (see for example the unit C). It is to facilitate this variation in spacing between adjacent slitters that the separating members 25 are grouped in units of different numbers and desirably the separating elements of each unit are formed integral so that they may be more easily removed or replaced.

It is however clearly to be understood that the invention is not limited to the thickness of separator or to the spacing shown, neither is it limited to the size and number of units employed. With the above arrangement a group of separators of one thickness may quickly be substituted for those of a different thickness, so that practically any combination of strips may be produced upon the machine at one operation.

Desirably the separators of each unit are integrally united at their upper edges by a bridge-like member 29 extending across the entire group of separators for each unit in back of the slitters and firmly binding said separators together, and this bridge-like member is of such a length that it will rest upon the upper edges of the holders 6 embraced thereby and so prevent tilting or displacement of the separators between the slitter holders.

By arranging the bridge member 29 above the slitter holders leaving the lower edges of the separators free it will be possible after pressure has been removed from the slitter holders by movement of the cams 15 to withdraw the separator units from their separating positions without disturbing the positions of the holders or without first removing the holders from the machine, and likewise separators of different thicknesses may be inserted while the holders are still in the machine.

Figure 6:
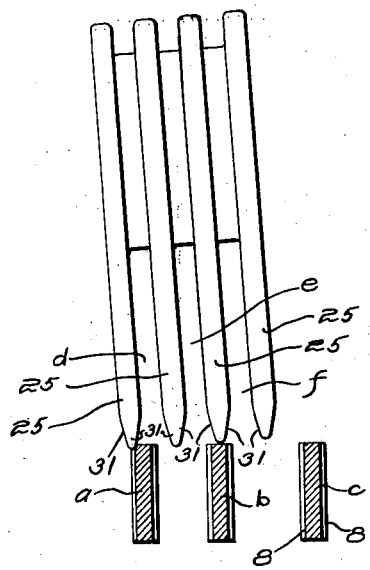
Fig. 6 is a diagrammatic view of one of the separator units about to be inserted in separating relation to a group of slitter holders which latter are shown in section.

To insert separators which are of a different thickness than the ones previously employed, it is obvious that there must be a shuffling of the slitter holders along the bar 14 in order to conform to the new spacing, and in the present example this readjustment or shuffling of said holders is greatly facilitated by tapering the forward ends of the separator members on opposite sides as shown at 31 (see Fig. 6).

By slightly tilting the separator unit as shown in Fig. 6, the slitter holders $a$, $b$ and $c$ may be shoved respectively into the spaces $d$, $e$ and $f$ between the separators 25, then by the pressing downwardly of the unit from the position shown in dotted lines (Fig. 1) and longitudinally of the holders to the full line position of said figure, the tapered ends 31 will cause said holders automatically to assume their proper positions.

The above operations may be repeated throughout the several groups until each holder and its slitter is arranged in the desired position. Clamps 33 are provided at the ends of the series of separators and holders for preventing movement thereof longitudinally of said bar 14, and these clamps have means, preferably screws 35, for securing them to said bar.

When the positioning of the slitters is completed the shaft 17 carrying the cam 15 may be rotated to raise the slitters and the springs 19 into contact with the platen roll 2 and the cross bar 23 respectively, in which position the said holders are maintained during the slitting of the work.

Ordinarily friction between the separators 25 and the adjacent slitter holders 6 will be sufficient to prevent movement of the separator longitudinally of the holders, but to positively prevent this I prefer to extend said separators 25 downwardly below the upper edge of the supporting bar 14 and recess them at 37 to straddle said bar.

The work indicated at 39 may be fed through the machine and taken care of in any appropriate manner, for example the platen roll 2 may be rotated and this roll in turn will rotate the slitters 4, said work being guided to the slitters and platen roll by guide rolls 41 and 42 and subsequently rewound upon a roll 43 which revolves in contact with the platen roll 2. It is however to be understood that the invention is not limited to this manner of handling the work.

Claims:

1. In a slitting machine, a series of slitters, a platen member for cooperating with said slitters, holders for said slitters, and unitary separating means for a series of said slitters arranged to be inserted between said slitter holders and to be supported thereby after the latter have been assembled in the machine.

2. In a slitting machine, a series of slitters, a platen member for cooperating with said slitters, holders for said slitters and unitary separating means for a group of said slitters arranged to be inserted between said slitter holders after the latter have been assembled in the machine, said holders and separating means having cooperating portions for supporting the latter relative to the former.

3. In a slitting machine, a series of slitters, a platen member for cooperating with said slitters, holders for said slitters comprising a group of spaced separators and separating means for said slitters of predetermined thickness arranged to be inserted as a unit between said slitter holders after the latter have been assembled in the machine.

4. In a slitting machine, a series of slitters, a platen member for cooperating with said slitters, holders for said slitters, a rocker support for said holders positioned below them, and unitary separating means for a series of said holders arranged to be inserted between them from above after they have been assembled in the machine.

5. A slitting machine comprising in combination, a platen member, slitters for cooperating with said platen member, holders for said slitters, means for maintaining said slitters in adjustable yielding engagement with said platen member and means to support said slitters against lateral movement and to space said slitters at predetermined distances apart including at least one group of integral elongated separating members of predetermined spacing arranged between said slitters.

6. A slitting machine comprising in combination, a platen member, slitters for cooperating with said platen member, holders for said slitters, means for maintaining said slitters in adjustable yielding engagement with said platen member and means to support said slitters against lateral movement and to space said slitters at predetermined distances apart including removable unitary series of separating members having supporting faces to engage substantial portions of said holders between said slitters.

7. A slitting machine comprising in combination, a platen member, slitters for cooperating with said platen member, holders for said slitters, means for maintaining said slitters in adjustable yielding engagement with said platen member and means to support said slitters against lateral movement and to space said slitters at predetermined distances apart including integral groups of separating members arranged to be removed without displacement of said slitters.

8. A slitting machine comprising in combination, a platen member, slitters for cooperating with said platen member, holders for said slitters, means for maintaining said slitters in adjustable yielding engagement with said platen member, means to support said slitters against lateral movement and to space said slitters at predetermined distances apart including a unitary series of holder spacing members extending longitudinally of said holders and between said slitters and means to position said spacers and said holders transversely with respect to the work.

9. In a slitting machine, a platen roll, a series of rotary slitters for cooperating with said platen roll, elongated holders for said slitters having a thickness approximating the minimum spacing of said slitters, a supporting member for said holders, and separating means of predetermined thickness arranged to be inserted or removed from between holders without removing said holders from the machine, said separating means having portions cooperating with said holders and having other portions cooperating with said support respectively for positioning said means transversely to and longitudinally of said holders.

10. In a slitting machine, a platen roll, a series of slitters for cooperating with said platen roll and arranged for movement longitudinally of said platen roll to vary the width of the work, holders for said slitters, a support for said holders adapted to maintain said slitters in engagement with said platen roll and removable separators for spacing said holders longitudinally of said platen roll, said separators having tapered portions for facilitating the insertion of said separators between said holders.

11. In a machine of the character described, a platen member, a series of slitters for cooperating with said platen member, holders for said slitters and means to position said holders at selected distances apart including units composed of a plurality of integral separating elements each of said elements being tapered to facilitate the insertion thereof between said holders.

12. In a machine of the character described, a platen member, a series of slitters for cooperating with said platen member, holders for said slitters and means to position said holders at selected distances apart and including separating elements having tapered portions to facilitate insertion of said elements between said holders.

13. A slitting machine having, in combination, a plurality of parallel slitters, means forming a platen cooperating with said slitters, elongated holders for said slitters, the latter being carried at one of the end portions of the former, means for supporting said holders for rocking movement in planes normal to said platen comprising an elongated support, said holders being slidable transversely on said support, and spacing means for said holders comprising a group of rigidly connected spacers, said spacers severally adapted to be inserted between the holders.

14. A slitting machine having, in combination, a plurality of parallel slitters, means forming a platen cooperating with said slitters, elongated holders for said slitters, the latter being carried at one of the end portions of the former, means for supporting said holders for rocking movement in planes normal to said platen comprising an elongated support, said holders being slidable transversely on said support, and spacing means for said holders comprising a member having a plurality of projecting spacers each adapted to be inserted between the holders, said spacers cooperating with said support for positioning them relative to said holders and engaging said holders adjacent said support and said slitters.

In testimony whereof, I have signed my name to this specification.

FRANK W. MERRICK.